(No Model.) 3 Sheets—Sheet 1.
L. F. HOLLOWAY & N. GRISWOLD.
COOKING STOVE.
No. 283,244. Patented Aug. 14, 1883.
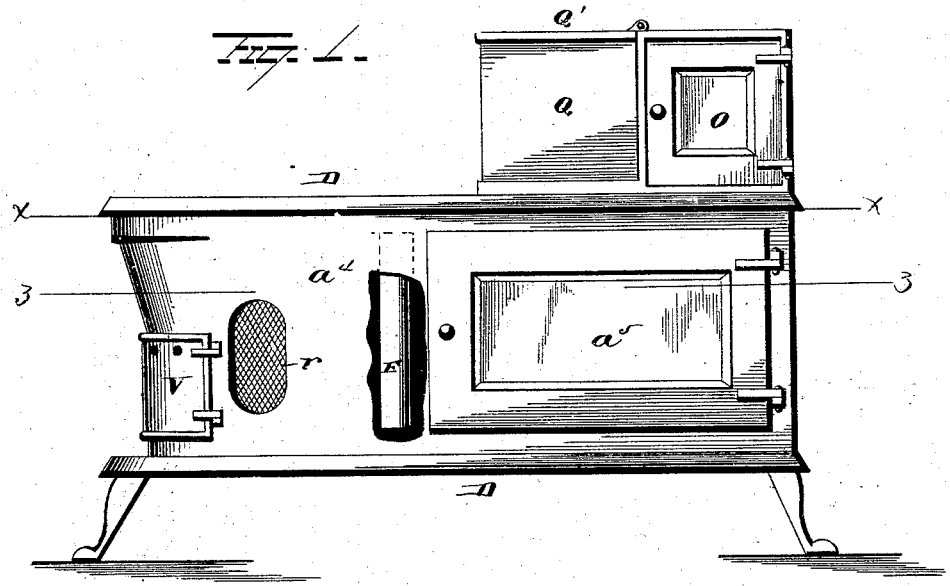
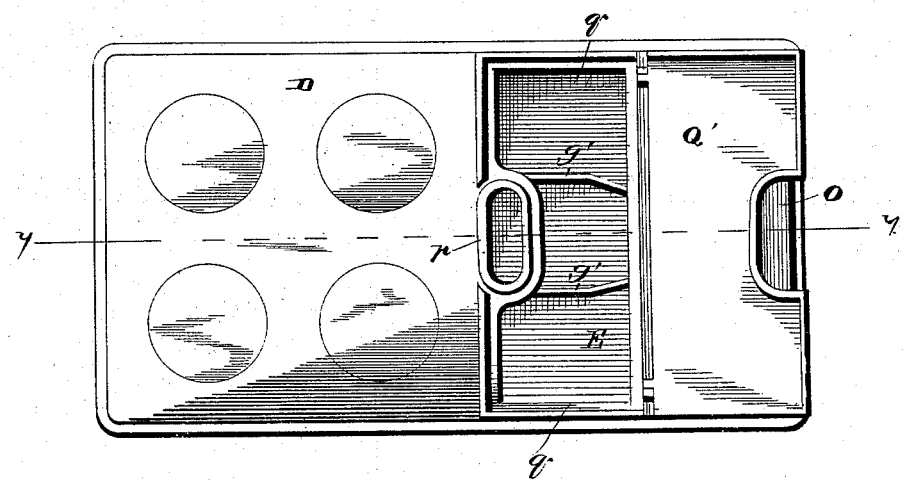
WITNESSES
G. F. Downing
George Cook
INVENTOR
L. F. Holloway
N. Griswold
B. P. Ha Symons, Attorney (No Model.) 3 Sheets—Sheet 2.

L. F. HOLLOWAY & N. GRISWOLD.
COOKING STOVE.

No. 283,244. Patented Aug. 14, 1883.

WITNESSES
G. F. Downing
George Cook

INVENTOR
L. F. Holloway
N. Griswold
By H. A. Symmom. Attorney (No Model.) 3 Sheets—Sheet 3.

L. F. HOLLOWAY & N. GRISWOLD.
COOKING STOVE.

No. 283,244. Patented Aug. 14, 1883.

WITNESSES
G. F. Downing
George Cook

INVENTOR
L. F. Holloway
N. Griswold
B. F. Suymom. Attorney

UNITED STATES PATENT OFFICE.

LEROY F. HOLLOWAY AND NORRIS GRISWOLD, OF JANESVILLE, WISCONSIN.

COOKING-STOVE.

SPECIFICATION forming part of Letters Patent No. 283,244, dated August 14, 1883.

Application filed February 26, 1883. (No model.)

*To all whom it may concern:*

Be it known that we, LEROY F. HOLLOWAY and NORRIS GRISWOLD, of Janesville, in the county of Rock and State of Wisconsin, have invented certain new and useful Improvements in Cooking-Stoves; and we do hereby declare the following to be a full, clear, and exact description of the invention, such as will enable others skilled in the art to which it pertains to make and use the same.

This invention relates to cooking-stoves for burning coal or wood, its object being to secure a more thorough utilization, distribution, and management of the heat than has been practicable heretofore in stoves of this class.

The invention consists, mainly, in a cooking-stove having an oven communicating with an annular space entirely surrounding the fire-pot, and also preferably the ash-pit, except such portion of the latter as is necessary to be accessible for the removal of ashes; and it consists, besides, in certain novel constructions and combinations of flues and dampers, and in a removable heat-distributer, and the combination of the same with the oven and fire-pot, all as will be hereinafter particularly described, and pointed out in the appended claims.

Figure 3:
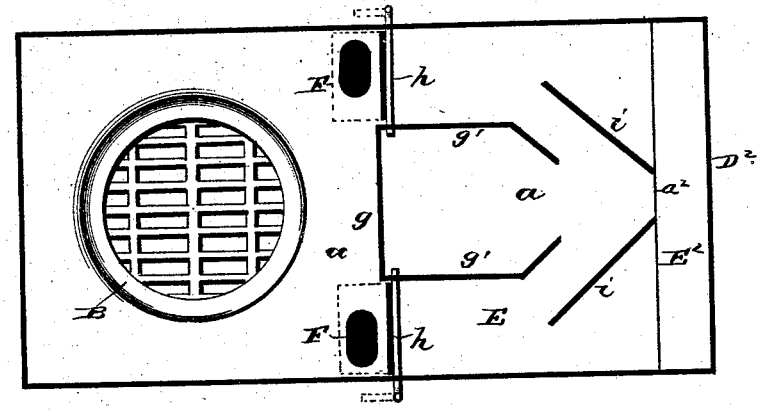
Figure 4:
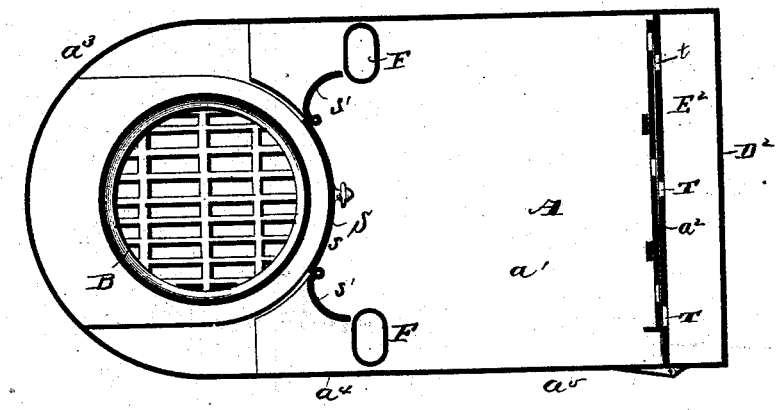
Figure 6:
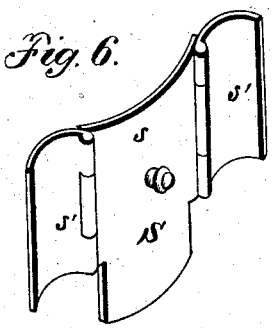
Figure 5:
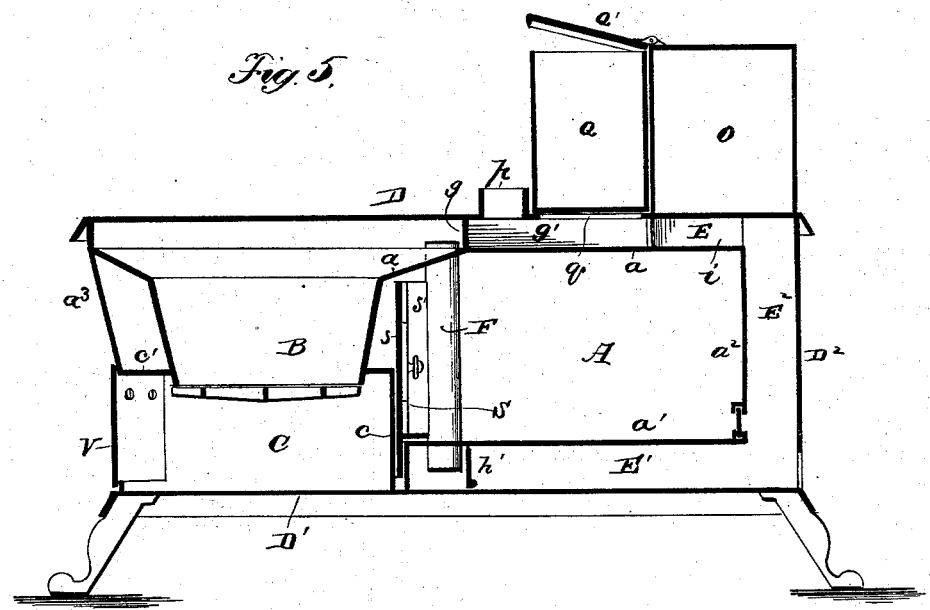
Figure 7:
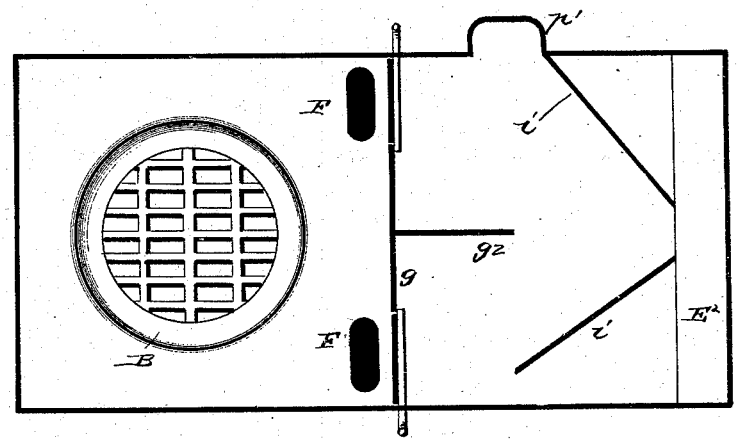

In the accompanying drawings, Figure 1 is a side elevation of a stove constructed according to our invention, a portion of the side walls around the fire-pot and ash-pit being broken away. Fig. 2 is a top view of the stove with the boiler removed. Fig. 3 is a horizontal section on the line $x\,x$, Fig. 1; Fig. 4, a similar view on line 3 3. Fig. 5 is a vertical section on the line $y\,y$, Fig. 2. Fig. 6 is a detached perspective view of the removable heat-distributer. Fig. 7 is a top view of a range embodying our invention.

The letter A indicates the oven, which is inclosed by its top plate, $a$, bottom plate, $a'$, rear wall, $a^2$, the front wall, $a^3$, the partial side walls, $a^4$, and the doors $a^5$. The top plate, $a$, has its forward portion depressed and provided with an opening, through which is suspended the fire-pot B, which is entirely surrounded by the oven, as will be seen.

The letter C designates the ash-pit, arranged below the fire-pot and mainly within the oven, from the open space of which it is partitioned off by a curved wall, $c$, and a horizontal partition, $c'$, through which the lower portion of the fire-pot extends. Between the top plate, D, and base-plate D' of the stove are flues E and E', which connect with a vertical flue, $E^2$, which is between the back wall, $a'$, of the oven and the back plate, $D^2$, of the stove. The flue E' is also divided from the ash-pit by the curved walls $c$. The top flue, E, and the bottom flue, E', are connected by the diving-flues F F, arranged on opposite sides of the fire-pot, and to the rear of said fire-pot is arranged a partial transverse partition, $g$, at each end of which are swinging damper-plates $h$, which, when raised, form, in connection with the partial partition $g$, a complete partition, which causes the products of combustion from the fire-pot to flow entirely downward through the diving-flues F F to the flue E', which passes under the oven and thence to the vertical flue $E^2$. These swinging dampers may be turned down either forward or rearward. When turned forward, they will close the top openings of the diving-flues, and, while opening the draft through the top flue, will also prevent any heat from passing through the bottom flue by way of the diving-flues. Experience has shown that heat will reach the flue under the oven through the diving-flues even though the top draft-flue be open. When the dampers are turned rearward, they simply open the top draft-flue and permit heat at the same time to pass down through the diving-flues, though in limited quantity.

Immediately to the rear of the lower ends of the diving-flues a swinging damper, $h'$, is arranged across the flue under the oven, and is useful in excluding heat from the lower flue when it is desired to leave the dampers $h$ up.

It will be observed that the pipe-thimble $p$ of the stove-top plate is arranged transversely at about the middle of said plate, and behind and partly at the ends of this thimble is formed an opening, $q$, over which is to be arranged the boiler Q, said boiler being located in front of a heating-oven, O, which is located upon the rear portion of the stove-top plate.

From the opposite ends of the partial partition $g$ wing-walls $g'$ extend rearwardly and approach each other somewhat at their rear extremities. To the rear of these wing-walls $g'$ are arranged oblique deflecting-plates $i\ i$, the outer ends of which extend nearly to the side walls of the stove, and the inner ends of which are separated by a narrow passage at the top of the vertical flue $E^2$. The object of these wing-walls and deflecting-plates is to secure a thorough distribution of the hot air and products of combustion under the boiler Q and heating-oven O. The boiler Q is removable; but its lid Q' is hinged to the heating-oven, so that it will always be in place when wanted.

In the rear wall of the oven are apertures $t$, governed by a sliding damper-plate, T, provided with apertures in the usual manner, and by operating this damper-plate it will be seen that a draft of hot air may be caused to flow through the oven from the vicinity of the fire-pot, when desired, and thorough ventilation of the oven be thus effected.

The letter S indicates a heat-distributer, located within the oven, directly in the rear of the fire-pot. This heat-distributer consists of a vertical center plate, $s$, having its lower edge, in the present instance, inserted in a slot formed to receive it in the bottom plate of the oven, and to the vertical edges of this center plate are hinged the wing-plates $s'$, which may be folded back behind the center plate or at any desired angle, or may be turned to close the spaces between the edges of the center plate and the diving-flues. It will be readily understood that by closing one of these passages and opening the other the heat may be thrown mainly to one side of the oven; or, by opening both passages slightly, the heat may be deflected from the center and to the sides of the oven, while by opening both passages even distribution of heat will be caused throughout the oven. This heat-distributer may be supported in any convenient manner, and may be suspended from the top or side walls of the oven.

In the side walls of the stove, on each side of the fire-pot, are set perforated plates $r$, through which air flows to the fire-pot, and is heated thereby to form the hot-air currents, which flow through and heat the oven from the interior.

V is the door of the ash-pit, to which access is had through the front wall of the stove, and the bottom of which is formed by the front portion of the bottom plate, D'.

In the top view, Fig. 7, is illustrated a simple modification of the arrangement of the stove-pipe thimble and deflecting-plates, adapting the same for a range. In this modification the pipe-thimble $p'$ is arranged at one side of the plate D, so as to come immediately behind one of the diving-flues, and one of the deflecting-plates, as shown at $i'$, is prolonged to touch the side wall of the stove-thimble. This prolongation of the deflecting-plates prevents the upward draft from the vertical flue $E^2$ from flowing directly to the smoke-pipe. With this arrangement of deflecting-plates we prefer to use a single wing-wall, $g^2$, extending from the middle of the partial partition. In a range, which is usually somewhat longer than a stove, the pot and boiler holes may be arranged over the space to the rear of the partial partition $g$ and the dampers, as well as in the front thereof.

Having now fully described our invention, we wish it to be understood that we do not limit ourselves to the precise details and the construction and arrangement of devices shown in our drawings, but may vary the same in any suitable manner for the better carrying out of our invention without departing from the essential principle thereof.

What we claim is—

1. In a cooking-stove for burning coal or wood, the combination, with the oven and a flue extending over the top thereof, of the fire-pot opening at its top into said flue, and having an unobstructed annular space entirely surrounding it, in connection with the oven, the said space and oven being in direct communication, substantially as shown and described.

2. The combination, with the stove-oven and the flue extending over the same, of the fire-pot suspended within a space communicating with the oven and entirely surrounded thereby, and the ash-pit having its side walls adjoining the front walls of the oven, whereby it is partially surrounded by the oven, substantially as described.

3. The combination, with the top flue, E, and the top stove-plate and its pipe-thimble, of the partial transverse partition $g$ and the wing-walls extending rearwardly therefrom, substantially as and for the purpose set forth.

4. The combination, with the top flue and the rear vertical flue having oblique deflecting-plates extending from its forward vertical side, of the partial transverse partition $g$, the wing-walls extending rearwardly from the ends of said partial partition, and the dampers at opposite ends of said partial partition, substantially as and for the purpose set forth.

5. The combination, with the oven and the fire-pot arranged at the front portion thereof, of the heat-distributer arranged in the rear of the fire-pot, and provided with the hinged wings, substantially as and for the purpose set forth.

6. The stove-oven and the annular space communicating therewith, whereby the fire-pot is surrounded, as described, the walls at the junction of the oven and the said space being perforated for the admission of air, substantially as set forth.

7. The combination, with the top and bottom flues and the diving-flues, of the partial partition extending across the top flue, and the dampers in the said flue, arranged to swing in either direction and to close the tops of the diving-flues when swung down in one given direction, substantially as and for the purpose set forth.

8. The combination, with the top and bottom flues and the diving-flue, of the partial partition extending across the top flue, the dampers in the said flue, arranged to swing in either direction, and the damper arranged across the bottom flue in the rear of the lower ends of the diving-flues, substantially as described.

In testimony whereof we have signed this specification in the presence of two subscribing witnesses.

LEROY F. HOLLOWAY.
NORRIS GRISWOLD.

Witnesses:
EDWIN F. CARPENTER,
H. S. HUMPHREY.